Patented Mar. 9, 1954

2,671,763

UNITED STATES PATENT OFFICE 2,671,763

REGENERATION OF NICKEL-SULFIDE-ALUMINA TYPE CATALYSTS

Leon O. Winstrom, East Aurora, N. Y., and William B. Harris, Benson, Ariz., assignors to Allied Chemical & Dye Corporation, New York, N. Y., a corporation of New York No Drawing. Application December 29, 1950, Serial No. 203,562

18 Claims. (Cl. 252—416)

This invention relates to a novel and improved process for regenerating certain nickel sulfide-alumina type catalysts employed in the catalytic hydrogenation of aromatic nitro compounds, and particularly in the vapor phase catalytic hydrogenation of nitrobenzene, to the corresponding amines, e. g. aniline, in accordance with copending application Serial No. 203,561 of L. O. Winstrom, filed of even date herewith.

Nickel sulfide and various other metal sulfides are well known catalysts for hydrogenation reactions, such as the hydrogenation of (1) coal and petroleum distillates, (2) omatic hydrocarbons, (3) diolefins and olefin polymers, (4) aromatic nitro compounds to the corresponding amines, etc. They are distinguished from the metal and metal oxide type catalysts by their effectiveness in the presence of sulfur compounds, and by their general ability to remain active for comparatively long periods of use. Nevertheless, the activity of such sulfactive catalysts declines gradually in use, the rate of decline depending on the particular catalyst, the reaction in which it is used and the conditions of operation. When the catalyst has lost so much of its activity that it can no longer be operated economically, in some instances it must be replaced by new catalyst, but more generally it can be regenerated and used again. In most cases the major cause of the deactivation of the catalyst in use is the deposition of carbonaceous deposits which cover the catalyst surface.

According to U. S. P. 2,398,175, the procedure for regenerating metal sulfide catalysts, including nickel sulfide, generally entails first burning off at least part of the carbonaceous deposits from the catalyst with air at above about 600° F. (315° C.). Under these conditions, the metal sulfides are converted to metal oxides. Thereafter, the catalyst is treated with a sulfiding agent such as hydrogen sulfide to convert the metal oxides back to the metal sulfides and is then reduced with hydrogen to produce the regenerated catalyst. U. S. P. 2,426,483 discloses reactivating metal sulfide catalyst, e. g. nickel sulfide, by treatment of a spent catalyst with a stream of air at temperatures between 350° F. (180° C.) and 550° F. (290° C.), but below that at which active exothermic reaction of the carbonaceous deposits or the sulfur sets in. Hence, in the process of this patent carbonaceous deposits are not removed from the catalyst during air treatment. In U. S. P. 2,402,493 is disclosed regeneration of nickel sulfide catalysts by burning off the carbonaceous deposit with air at about 400° C., but the patent indicates this treatment may cause an excessive loss of sulfur from the catalyst.

In the above mentioned Winstrom application, there is described and claimed an improved process for the hydrogenation of aromatic nitro compounds, particularly for the vapor phase hydrogenation of nitrobenzene to aniline, using as catalyst nickel sulfide associated with activated or amorphous alumina as promoter. It is an object of this invention to afford improved procedure for regenerating the catalyst employed in the foregoing reaction. Another object is to provide a convenient and non-hazardous regeneration process for such catalyst which substantially increases the life of the catalyst and enables it to be repeatedly regenerated substantially without loss of effectiveness. Other objects and advantages will appear as the description of the invention proceeds.

We have now found that a catalyst comprising nickel sulfide associated with activated alumina or amorphous alumina may be repeatedly and safely regenerated without substantial loss of life or activity thereof, by treating the partially spent catalyst with an oxygen containing gas while maintaining the catalyst at a temperature of about 300–700° C., for a period sufficient to substantially remove carbonaceous impurities on said catalyst and, without any intervening sulfiding step, treating the thus oxidized catalyst with a hydrogen containing gas while maintaining the catalyst at about 200–700° C. We have discovered that the sulfur in the above catalyst is so firmly bound that it is not lost to any substantial degree during burning off of carbon deposited on the catalyst or during subsequent hydrogenation of the catalyst under the above conditions. This discovery has led to our improved process involving effective regeneration of the above catalysts merely by burning off carbonaceous impurities followed by hydrogenation, thus eliminating the expensive and hazardous sulfiding treatment. In our process, as is hereinafter demonstrated, the subsequent treatment with hydrogen following oxidation is necessary to restore the catalyst substantially completely to its original activity and life.

As set forth in the above Winstrom application, the instant catalysts comprising nickel sulfide associated with activated or amorphous alumina as promoter, are believed to contain the sulfur and nickel mainly in the form of a mixture of NiS, $NiS_2$ and $Ni_3S_2$, and apparently do not lose substantial amounts of sulfur during use and/or reactivation in accordance with the invention process.

The Winstrom application further points out that the nickel sulfide-activated alumina catalyst, considered to contain a substantial proportion of amorphous alumina, may be prepared in any suitable manner, e. g. impregnating an activated alumina with a soluble nickel salt such as nickel nitrate, heating the salt at a temperature not above 800° C., preferably not above about 500° C., to decompose the salt to the oxide and treating the oxide with a sulfiding agent, e. g. hydrogen sulfide, to form the desired nickel sulfide-activated alumina catalyst. The activated alumina, if present in substantially large amounts, may function as a carrier as well as a promoter.

The nickel sulfide-amorphous alumina type catalysts may also be prepared in any suitable manner, as described in the above Winstrom application. Such catalysts may be obtained by coprecipitating a mixture of nickel and aluminum hydroxides and/or carbonates or by commingling separately prepared gels (gelatinous precipitates) of these compounds, followed by heating and sulfiding such coprecipitates or gels.

Thus, a catalyst consisting of an intimate mixture of nickel sulfide and amorphous alumina may be prepared by treating an aqueous solution of water-soluble aluminum and nickel salts with an alkaline medium, e. g. ammonium carbonate or hydroxide, to form a coprecipitate of nickel and aluminum hydroxides or carbonates, followed by heating and reacting the coprecipitate with a sulfiding agent to produce the catalyst. Preferred procedure for preparing such nickel sulfide-amorphous alumina catalyst involves coprecipitating nickel and aluminum hydroxides and/or carbonates, or by separately precipitating and commingling such hydroxides and/or carbonates, heating the thus formed precipitate, say at about 90-100° C. in the presence of water to produce a material comprising a substantial proportion of a hydrated nickel aluminate such as $Ni_2Al_2O_5 \cdot xH_2O$, followed by heating and sulfiding with $H_2S$. In this connection, the above nickel sulfide-amorphous alumina catalysts may also be obtained by sulfiding a material comprising essentially a hydrated nickel aluminate prepared in any suitable manner.

Yet another method for preparing a nickel sulfide-amorphous alumina catalyst involves coigniting or heating a mixture of nickel and aluminum salts to produce a mixture of nickel and aluminum oxides and treating the mixed oxides with a suitable sulfiding agent.

As pointed out in the Winstrom application, the above noted nickel sulfide-activated alumina catalysts and nickel sulfide-amorphous alumina catalysts obtained by coignition of a mixture of nickel and aluminum salts, contain nickel sulfide as the sole metal sulfide, while the nickel sulfide-amorphous alumina catalysts obtained from precipitation of a mixture of nickel and aluminum hydroxides and/or carbonates, or from a hydrated nickel aluminate, may contain small amounts of metal sulfides in addition to nickel sulfide, e. g. copper sulfide.

The amount of activated or amorphous alumina present in the foregoing nickel sulfide-alumina type catalysts may be as low as 2% by weight of the catalyst mixture. Generally, however, the alumina promoter is employed in quantities of at least 10% by weight of the above catalyst, and for best results, in a proportion from about 10% to 90% by weight of the catalyst composition. Where the activated alumina is employed and functions both as a promoter and carrier, larger amounts of such alumina may be utilized.

The above nickel sulfide-activated alumina and nickel sulfide-amorphous alumina catalysts in admixture with each other and/or with other suitable materials of a catalytic or non-catalytic nature, may also be regenerated in accordance with the invention. Further, the regeneration process herein is applicable to the nickel sulfide-alumina type catalyst compositions described above and supported on carriers such as silica or the various clays.

In carrying out the hydrogenation of nitrobenzene to aniline, a mixture of nitrobenzene vapors and hydrogen, preferably at a temperature of 250-350° C., is passed over the nickel sulfide catalyst associated with activated or amorphous alumina, employing about 1½ to 5 times the amount of hydrogen theoretically required for the reaction, corresponding to about 4½ to 15 mols of hydrogen per mol of nitrobenzene. In carrying out the reaction the foregoing catalyst compositions may be utilized in the form of fixed catalyst beds or fluidized catalyst masses in a manner known in the art.

When the catalyst becomes partially spent or begins to lose its effectiveness, a stream of oxygen or oxygen-containing gas such as air, preferably containing steam, is passed into contact with, or through, a bed of the catalyst to be reactivated. An exothermic reaction takes place whereby carbonaceous accumulations on the catalyst are burned and removed. The temperature of the oxygen containing gas is such that the catalyst is maintained at a sufficiently elevated temperature to cause the carbonaceous deposits, at least in part, to be oxidized and removed as $CO_2$. To accomplish this purpose, we have found that the minimum temperature of the catalyst should be about 300° C. The maximum catalyst temperature attained during the oxidation treatment depends upon a number of factors, such as rate and concentration of the oxidizing gas, nature and condition of the catalyst to be regenerated, heat transfer properties of the catalyst, etc. We have found that the maximum catalyst temperature should not be materially above 700° C. and preferably not above 500° C. If the catalysts hereof are oxidized with air say at 850° C., the nickel sulfides are completely converted to nickel oxide, which is of course undesirable.

The air used in the oxidation step of the catalyst regeneration process hereof is preferably diluted with steam which serves both as a cooling medium and to reduce the concentration of oxygen, so as to control the temperature within the desired limits. Other inert gases such as carbon dioxide and nitrogen may be used in place of steam. The use of such diluent gases may, however, be eliminated entirely by employing a sufficiently low air feed rate and catalyst temperature; but this procedure is slower and less desirable.

After the catalyst has been subjected to the oxidizing treatment, but before it is reduced with hydrogen, it is purged of oxygen containing gases with carbon dioxide or another inert gas to minimize the danger of explosion.

The hydrogen treatment should be carried out at a temperature at which hydrogen is strongly absorbed by the catalyst and an exothermic reaction is produced. For this purpose the catalyst temperature is maintained at between 200 and 700° C., and preferably between 300 and 500° C. By carrying out the reduction within the aforesaid temperature ranges, a large part or substantially all of the original activity of the catalyst may be restored depending upon the efficiency of the hydrogen treatment. As in the case of the above oxidation step of the regeneration process, the hydrogen employed in the reduction step is preferably mixed with an inert gas such as steam to function as a cooling and diluting medium for proper control of temperature.

It has been found preferable to effect the hydrogen treatment at about the same temperature as the treatment with oxygen, and to perform both of these oxidation and reduction treatments at a temperature above that at which the regenerated catalyst is to be used in the hydrogenation of aromatic nitro compounds. For example, the oxidation and hydrogenation steps of the catalyst regeneration process of the invention are desirably conducted at about 400° C., and the catalyst used in the hydrogenation of nitrobenzene to aniline employing a catalyst temperature of about 300° C. As already indicated, no substantial loss of sulfur from the catalyst occurs during the improved regeneration process of the invention, which is indicated by the fact that the catalysts can be reactivated many times and returned each time to the hydrogenation of aromatic nitro compounds reaction apparently without material loss of efficiency.

The following examples illustrate practice of the invention, quantities being expressed in parts by weight:

*Example 1.*—A catalyst was prepared by impregnating and coating 465 parts of fused crystallized nickel nitrate, $Ni(NO_3)_2.6H_2O$, on 300 parts of 6–10 mesh activated alumina (Grade F–10 marketed by the Aluminum Company of America), heating the "green" catalyst in a stream of air at 450° C., and sulfiding the resulting catalyst with hydrogen sulfide at 450° C., as described more fully in Example 1 of the above mentioned Winstrom application. A mixture of nitrobenzene vapors and an amount of hydrogen corresponding to about 3 times that required by theory to form aniline (about 9 mols $H_2$/mol nitrobenzene) was passed over this catalyst in a Downs type converter (described in U. S. P. 1,604,739) with a bath temperature at 300° C. and at an hourly rate of about 31 grams of nitrobenzene per 100 cc. of catalyst. The yield of aniline by reduction of the nitrobenzene in this manner was substantially quantitative.

The catalyst was operated in the foregoing manner for about 540 hours before its activity declined to a point where it no longer converted more than about 95% of the nitrobenzene to aniline under the reaction conditions. The nitrobenzene feed was then stopped, and the catalyst was purged of hydrogen with carbon dioxide and regenerated in the manner described below.

A mixture of air and steam was passed for ½ hour through the catalyst bed with the surrounding bath maintained at a temperature of 300° C. using an air feed of 0.17 cu. ft. (N. T. P.) per hour and a steam feed of 52 grams per hour per 100 cc. of catalyst. During this period a temperature peak (a zone of maximum exothermic reaction) traveled through the catalyst bed in the direction of flow of the gases, as indicated by a thermocouple well embedded in the catalyst bed. Thereafter, the following schedule was observed, all feed rates being based on 100 cc. of catalyst:

(a) The air feed was increased to 0.69 cu. ft. per hour for a period of 2 hours during which the steam feed was maintained at 52 grams per hour, and the bath temperature was gradually raised to 400° C.;

(b) The air feed was raised to 1.38 cu. ft. per hour for 7 hours, while maintaining the steam feed and temperature the same as in (a);

(c) The steam feed was reduced to 25 grams per hour for 6 hours during which the temperature and air feed were kept the same as in (b);

(d) The steam feed was shut off completely for 7 hours while maintaining the temperature and air feed the same as in (c);

(e) The air feed was stopped and the catalyst bed was purged of air with carbon dioxide, the bath temperature being maintained at 400° C.;

(f) A mixture of steam and hydrogen, at an hourly rate of 52 grams of steam and 0.23 cu. ft. of hydrogen (N. T. P.), was passed through the catalyst for ¾ hour with the bath temperature at 400° C.;

(g) The steam feed was reduced to 25 grams per hour and the hydrogen flow was raised to 0.69 cu. ft. per hour for ½ hour during which the catalyst was held at about 400° C.;

(h) The steam feed was stopped and the hydrogen feed was maintained at 0.69 cu. ft. per hour for 2 hours while maintaining the temperature at 400° C.;

(i) The catalyst was cooled by adjustment of bath temperature to 300° C. while maintaining the hydrogen flow as in (h), after which the flow of a mixture consisting of the previously noted proportion of nitrobenzene and hydrogen, was started to resume the production of aniline.

When the feeds of nitrobenzene and hydrogen were resumed and the hydrogenation was carried out in the manner described above, it was found that the activity and life of the catalyst regenerated in the foregoing manner were substantially equal to those of (1) the original catalyst and (2) the same catalyst, after regeneration by a sulfiding treatment with $H_2S$ (using $H_2S$ with or without hydrogen in steps (f) and (g) above).

The catalyst was then regenerated 10 times, and it was operated for a total of more than 4500 hours, during which it converted over 1400 grams of nitrobenzene per cc. of catalyst. The hydrogenation was thereafter discontinued, although at that time there had been no substantial decline in the performance of the catalyst.

In the oxidation step of the regeneration process illustrated in the foregoing example, it was observed that the reaction and heat evolution were localized in a so-called "temperature peak," which traveled from one end of the bed to the other. After the initial exothermic reaction had run its course, the catalyst temperature and/or the concentration of air in the gas stream were raised in successive steps so as to increase the intensity of the oxidation treatment. In each of the subsequent treatment steps there was little evidence of a temperature peak, suggesting that the oxidation reaction was substantially completed in the initial treatment with air. The maximum (peak) temperature of the catalyst during the oxidation treatments described in the example was in the neighborhood of about 450° C. When the maximum temperature during the oxidation of a spent catalyst of the type described in the example was permitted to rise above about 700° C., the catalyst became sintered and some sulfur was oxidized and removed therefrom as $SO_2$, yielding a regenerated catalyst which possessed considerably lower activity and considerably shorter life than the original catalyst.

When hydrogen was initially passed through the catalyst, as shown in the above example, it was strongly absorbed during which an exothermic reaction in the form of a temperature "peak" traveled through the catalyst bed. Subsequently, the catalyst was subjected to successive hydrogen treatments, each at a higher hydrogen concentration than the preceding. Lack of a noticeable exothermic reaction in the subsequent treatments with hydrogen appears to indicate that the reduction was substantially complete after the initial hydrogen treatment.

The treatment of the oxidized catalyst with hydrogen in accordance with the present invention is essential and should be effected before the catalyst is used again for hydrogenating nitrobenzene to aniline. Otherwise the life and, from all indications, the efficiency of the catalyst are greatly reduced. Thus, we have found that when a catalyst similar to that of the above example was reactivated substantially as described therein but without the hydrogen aftertreatment and used again for hydrogenating nitrobenzene under conditions similar to those in the example, it lasted only about half as long before it "died," i. e. about 175 hours, as a like catalyst which had been regenerated by oxidation followed by reduction with hydrogen in accordance with the invention. In use the catalyst bed regenerated without reduction by hydrogen became badly coated with carbonaceous deposits at that portion first contacted by the hydrogen-nitrobenzene vapor stream, and this considerable portion of the catalyst was thereby rendered practically inactive and inoperative in the reaction.

*Example 2.*—A catalyst was prepared by coprecipitating a mixture of nickel and aluminum hydroxides and/or carbonates by addition of a solution of 665 parts of ammonium carbonate, $(NH_4)_2CO_3.H_2O$, in 3850 parts of distilled water to a solution of 291 parts of nickel nitrate $(Ni(NO_3)_2.6H_2O)$ and 750 parts of aluminum nitrate $(Al(NO_3)_3.9H_2O)$ in 1000 parts of distilled water, and sulfiding the resulting coprecipitate with $H_2S$, as described more fully in Example 4 of the above mentioned Winstrom application. A mixture of nitrobenzene vapors and an amount of hydrogen about 3 times that required by theory to form aniline was passed over this catalyst in a Downs type converter with surrounding bath at 300° C. and at an hourly rate of about 25 grams of nitrobenzene per 100 cc. of catalyst. The yield of aniline by reduction of the nitrobenzene in this manner was substantially quantitative.

The catalyst was operated in the foregoing manner for about 1000 hours before its activity declined to a point where it no longer converted more than about 95% of the nitrobenzene to aniline under the reaction conditions. The nitrobenzene feed was then stopped, and the catalyst was purged of hydrogen with carbon dioxide and regenerated as follows, all feed rates being based on 100 cc. of catalyst:

(a) A mixture of air and steam was passed through the catalyst bed with the surrounding bath maintained at a temperature of 300° C. for ½ hour, using an air feed of 0.09 cu. ft. per hour (N. T. P.) and a steam feed of 40 grams per hour.

(b) The air feed was increased to 0.50 cu. ft. per hour and the bath temperature was raised to 350° C. during 2 hours while maintaining the steam feed at 40 grams per hour.

(c) The steam feed was reduced to 20 grams per hour for 6 hours during which the temperature and air feed were kept the same as in (b).

(d) The steam feed was shut off for 7 hours while maintaining the temperature and air feed the same as in (c).

(e) The air feed was stopped and the catalyst bed was purged of air with carbon dioxide with the bath temperature at 350° C.

(f) A mixture of steam and hydrogen, at an hourly rate of 40 grams steam and 0.41 cu. ft. hydrogen, was passed through the catalyst for ¾ hour with the bath temperature at 350° C.

(g) The steam feed was reduced to 20 grams per hour while maintaining the temperature and hydrogen feed rate as in (f) for ½ hour.

(h) The steam feed was shut off and the hydrogen feed and temperature were maintained as in (g) for 2 hours.

(i) The catalyst was cooled by adjustment of bath temperature to 300° C. while maintaining the hydrogen flow as in (h), after which the flow of a mixture of nitrobenzene and hydrogen in the aforementioned proportions, was started to resume the production of aniline.

When the feeds of nitrobenzene and hydrogen were resumed and the hydrogenation was carried out in the foregoing manner, it was found that the activity and life of the regenerated catalyst were substantially equal to those of the original catalyst.

While the period of time required for the oxidation and reduction steps of the regeneration process of the invention may vary depending on temperature of treatment, concentration of oxygen and hydrogen in the gases employed, etc., experience has shown that in general practice, when maintaining catalyst temperature within the preferred 300–500° C. temperature range, the time required for treatment with oxygen and with hydrogen ranges, in each case, from about ½ to about 24 hours.

From the foregoing, it is apparent that contrary to all indications of the prior art, catalysts comprising nickel sulfide associated with activated alumina or amorphous alumina as promoter and which are particularly valuable in the commercially important process for hydrogenation of nitrobenzene to aniline, may be readily and repeatedly regenerated by the improved oxidation-reduction process described herein with substantially no loss of catalyst life or activity, while eliminating the hazardous sulfiding step generally regarded as necessary for successful regeneration of catalysts of this type.

Since various changes and modifications may be made in the invention without departing from the spirit thereof, the invention is to be taken as limited only by the scope of the appended claims.

We claim:

1. The process for regenerating a catalyst comprising nickel sulfide associated with a substance of the group consisting of activated alumina and amorphous alumina, which process comprises treating the partially spent catalyst with an oxygen containing gas while maintaining said catalyst at a temperature of about 300–700° C., for a period sufficient to substantially remove carbonaceous impurities on said catalyst and, without any intervening sulfiding step, treating the thus oxidized catalyst with a hydrogen containing gas for a period sufficient to reactivate the catalyst while maintaining said catalyst at about 200-700° C.

2. The process as defined in claim 1 wherein the temperature of said catalyst during treatment with said oxygen containing gas and said hydrogen containing gas is maintained at 300-500° C. and the time for treatment ranges, in each case, from about ½ to about 24 hours.

3. The process as defined in claim 1 wherein the catalyst employed comprises nickel sulfide associated with activated alumina in an amount of at least 10% by weight of said catalyst.

4. The process as defined in claim 1 wherein the catalyst employed comprises nickel sulfide associated with amorphous alumina in an amount of at least 10% by weight of said catalyst.

5. The process as defined in claim 1 wherein said oxygen containing gas is air, said air being diluted with an inert gas, and the temperature of said catalyst during treatment with said oxygen containing gas and said hydrogen containing gas is maintained at 300-500° C.

6. The process as defined in claim 1 wherein the catalyst employed comprises nickel sulfide as the sole metal sulfide and a substantial proportion of activated alumina as carrier and promoter, the temperature of said catalyst during oxidation and reduction is maintained at 300-500° C., the oxygen containing gas is air diluted with steam, and the hydrogen containing gas is hydrogen diluted with steam.

7. The process for regenerating a catalyst comprising nickel sulfide as the sole metal sulfide supported on activated alumina as promoter, said catalyst having been prepared by impregnating a substantial proportion of activated alumina with a soluble nickel salt, heating said salt at a temperature not above 800° C. to decompose it to the oxide and reacting said oxide with a sulfiding agent, which process comprises contacting the partially spent catalyst with air at 300-500° C. for a period sufficient to substantially remove carbonaceous impurities on said catalyst and, without any intervening sulfiding step, contacting the thus oxidized catalyst with hydrogen at 300-500° C. for a period sufficient to reactivate the catalyst.

8. The process as defined in claim 7 wherein the amount of activated alumina present in said catalyst is at least 10% by weight thereof.

9. The process as defined in claim 7 wherein said air and hydrogen are diluted with steam and the time for treatment with air and with hydrogen ranges, in each case, from about ½ to about 24 hours, said catalyst being purged of air prior to treatment with hydrogen by passing an inert gas into contact with said catalyst.

10. The process for regenerating a catalyst comprising a mixture of nickel sulfide and amorphous alumina, said catalyst having been prepared by forming a mixture of percipitates of insoluble compounds of nickel and aluminum selected from the group consisting of hydroxides and carbonates, followed by reaction with a sulfiding agent, which process comprises treating the partially spent catalyst with an oxygen containing gas while maintaining said catalyst at a temperature of about 300-700° C. for a period sufficient to substantially remove carbonaceous impurities on said catalyst and, without any intervening sulfiding step, treating the thus oxidized catalyst with a hydrogen containing gas for a period sufficient to reactivate the catalyst while maintaining said catalyst at about 200-700° C.

11. The process for regenerating a catalyst comprising an intimate mixture of nickel sulfide and amorphous alumina, said catalyst having been prepared by treating aqueous solutions of water-soluble aluminum and nickel salts in alkaline medium to form precipitates of insoluble compounds of nickel and aluminum selected from the group consisting of hydroxides and carbonates, forming a mixture of said precipitates of nickel and aluminum, and heating and reacting said mixture with a sulfiding agent to form nickel sulfide, which process comprises contacting the partially spent catalyst with air at 300-700° C. for a period sufficient to substantially remove carbonaceous impurities on said catalyst and, without any intervening sulfiding step, contacting the thus oxidized catalyst with hydrogen at 200-700° C. for a period sufficient to reactivate the catalyst.

12. The process for regenerating a catalyst essentially comprising an intimate mixture of nickel sulfide and amorphous alumina, said catalyst having been prepared by treating an aqueous solution of water soluble aluminum and nickel salts in alkaline medium to form a coprecipitate of insoluble compounds of nickel and aluminum selected from the group consisting of hydroxides and carbonates, heating said coprecipitate to a temperature of about 90-100° C. in the presence of water for a period sufficient to produce a substantial proportion of a hydrated nickel aluminate, and heating and reacting the resulting material with a sulfiding agent to form nickel sulfide, the amount of amorphous alumina present in said catalyst being at least 10% by weight of said catalyst mixture, which process comprises contacting the partially spent catalyst with air at 300-500° C., for a period sufficient to substantially remove carbonaceous impurities on said catalyst and, without any intervening sulfiding step, contacting the thus oxidized catalyst with hydrogen at 300-500° C. for a period sufficient to reactivate the catalyst.

13. The process as defined in claim 12 wherein said air and hydrogen are diluted with steam and the time for treatment with air and with hydrogen ranges, in each case, from about ½ to about 24 hours, said catalyst being purged of air prior to treatment with hydrogen by passing an inert gas into contact with said catalyst.

14. The process for regenerating a catalyst comprising an intimate mixture of nickel sulfide and amorphous alumina as promoter, said catalyst having been prepared by treating an aqueous solution of water soluble aluminum and nickel salts with an alkaline medium to form a coprecipitate of insoluble compounds of nickel and aluminum selected from the group consisting of hydroxides and carbonates, followed by heating and reacting said coprecipitate with a sulfiding agent, the amount of amorphous alumina present in said catalyst being from about 10 to 90% by weight of said catalyst mixture, which process comprises contacting the partially spent catalyst with air at 300-500° C., for a period sufficient to substantially remove carbonaceous impurities on said catalyst, and without any intervening sulfiding step, contacting the thus oxidized catalyst with hydrogen at 300-500° C. for a period sufficient to reactivate the catalyst.

15. The process for regenerating a partially spent catalyst comprising nickel sulfide associated with a substance of the group consisting of activated alumina and amorphous alumina, and which has become partially spent in the catalytic hydrogenation of an aromatic nitro compound to the corresponding amine, which comprises treating the partially spent catalyst with air at about 300–700° C., for a period sufficient to substantially remove carbonaceous impurities on said catalyst and, without any intervening sulfiding step, treating the thus oxidized catalyst with a hydrogen containing gas at 200–700° C. for a period of at least ½ hour.

16. The process for regenerating a partially spent catalyst comprising nickel sulfide associated with a substance of the group consisting of activated alumina and amorphous alumina, the amount of alumina being at least 10% by weight of said catalyst, and which has become partially spent in the vapor phase catalytic hydrogenation of nitrobenzene to aniline at temperatures of 250° to 350° C., which comprises passing a stream of air into contact with said catalyst at a temperature of 300–500° C. for a period sufficient to remove carbonaceous impurities on said catalyst, purging said catalyst of air with an inert gas and, without any intervening sulfiding step, passing a stream of hydrogen into contact with said catalyst at a temperature of 300–500° C. for a period sufficient to reactivate the catalyst.

17. The process as defined in claim 16 wherein a catalyst temperature of about 400° C. is maintained during treatment of the catalyst with air and with hydrogen in the regeneration step of the process and the time for treatment with air and with hydrogen ranges, in each case, from about ½ to about 24 hours.

18. The process for regenerating a catalyst comprising an intimate mixture of nickel sulfide and amorphous alumina, said catalyst having been prepared by treating aqueous solutions of water-soluble aluminum and nickel salts in alkaline media to form precipitates of insoluble compounds of nickel and aluminum selected from the group consisting of hydroxides and carbonates, forming a mixture of said precipitates of nickel and aluminum, and heating said mixture of precipitates of nickel and aluminum in the presence of water to produce a material comprising a substantial proportion of a hydrated nickel aluminate, followed by heating and reacting said material with a sulfiding agent to form nickel sulfide, which process comprises contacting the partially spent catalyst with air at 300–700° C. for a period sufficient to substantially remove carbonaceous impurities on said catalyst and, without any intervening sulfiding step, contacting the thus oxidized catalyst with hydrogen at 200–700° C. for a period sufficient to reactivate the catalyst.

LEON O. WINSTROM.
WILLIAM B. HARRIS.

References Cited in the file of this patent
UNITED STATES PATENTS

| Number | Name | Date |
| --- | --- | --- |
| 1,908,338 | Franceway | May 9, 1933 |
| 2,039,259 | Pier et al. | Apr. 28, 1936 |
| 2,137,407 | Lazier | Nov. 22, 1936 |
| 2,402,440 | Owen | June 18, 1946 |
| 2,430,421 | Gage | Nov. 4, 1947 |
| 2,455,713 | Voochies | Dec. 7, 1948 |
| 2,511,453 | Barry | July 13, 1950 |
| 2,518,474 | Hudson | Aug. 15, 1950 |
| 2,530,998 | Scharmann | Nov. 21, 1950 |